E. E. LILES.
ATTACHMENT FOR CULTIVATORS.
APPLICATION FILED AUG. 9, 1920.
1,401,802.
Patented Dec. 27, 1921.
2 SHEETS—SHEET 1.
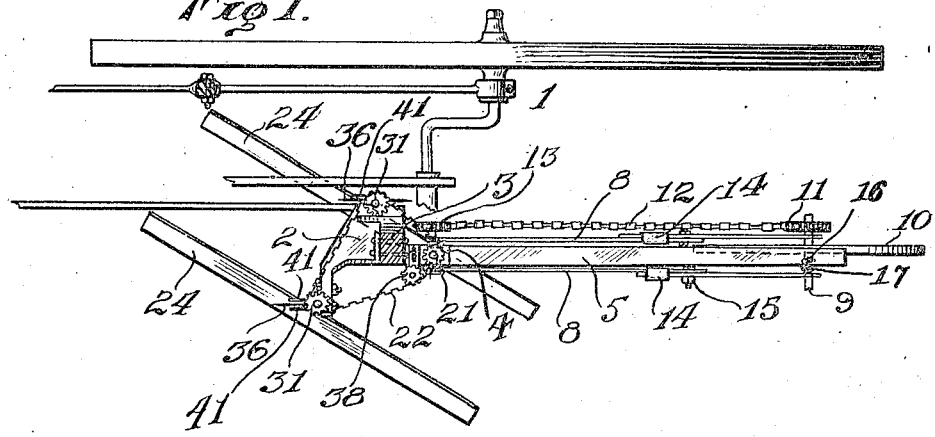
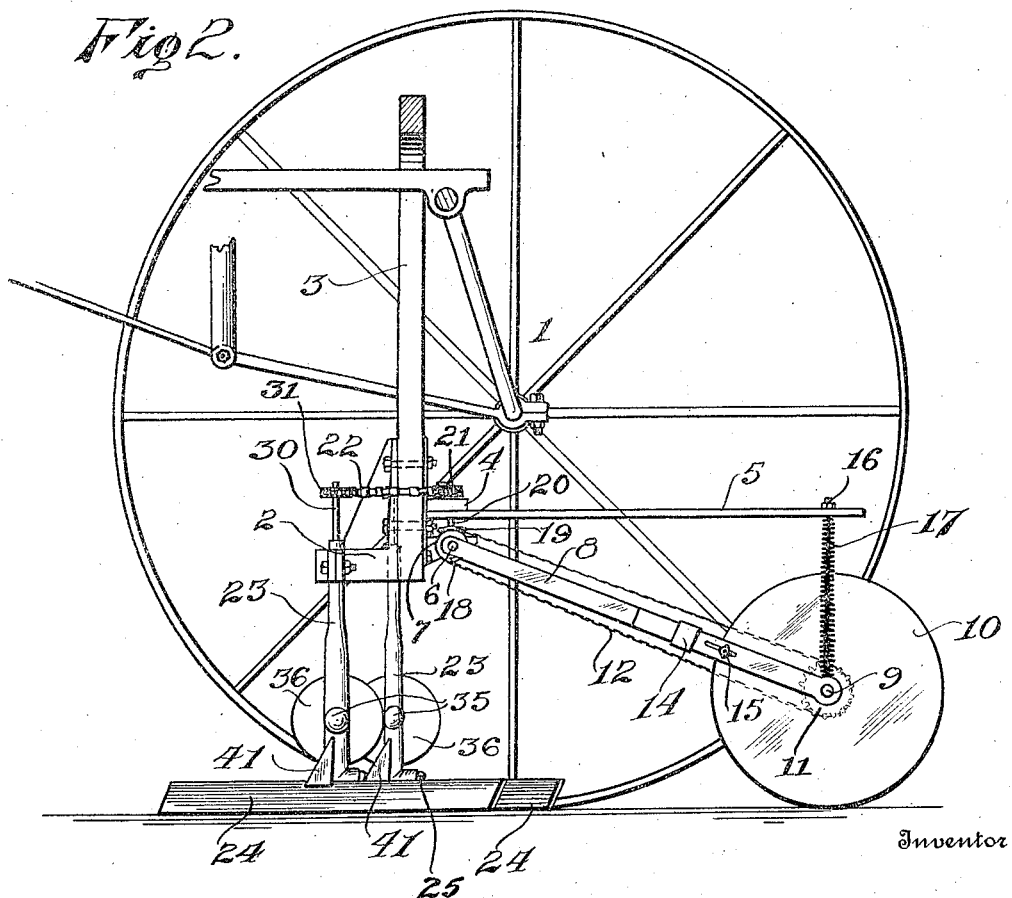
Inventor
Elmer E. Liles
By Lacey & Lacey, Attorneys

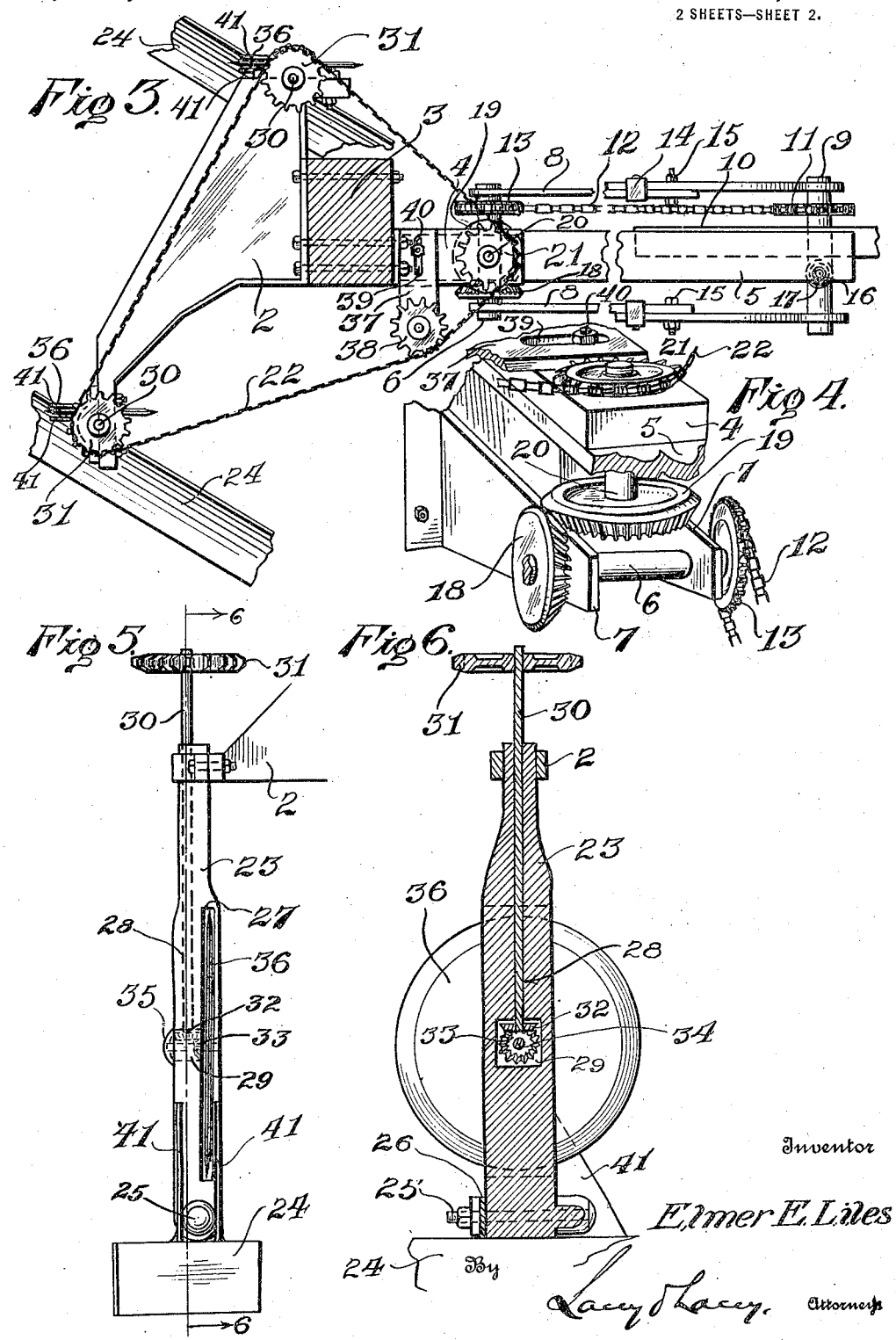

UNITED STATES PATENT OFFICE.

ELMER E. LILES, OF UTICA, ILLINOIS.

ATTACHMENT FOR CULTIVATORS.

1,401,802.

Specification of Letters Patent. Patented Dec. 27, 1921.

Application filed August 9, 1920. Serial No. 402,111.

*To all whom it may concern:*

Be it known that I, ELMER E. LILES, a citizen of the United States, residing at Utica, in the county of La Salle and State of Illinois, have invented certain new and useful Improvements in Attachments for Cultivators, of which the following is a specification.

This invention is an attachment for cultivators having for its object the prevention of the scrapers or cultivator blades becoming clogged by an accumulation of weeds and vines. Specifically stated, the invention seeks to provide a simple and inexpensive mechanism which may be readily mounted upon a cultivator frame and which will include a cutter disposed adjacent the cultivator blades whereby vines, weeds and similar growth raised from the surface of the ground by the cultivator blades will be cut through and thereby prevented from clinging to and clogging the action of the cultivator. The invention seeks further to provide means whereby the said cutter will be rotated positively as the cultivator is drawn over a field so that the weeds and vines will be positively severed. These stated objects and other objects which will incidentally appear in the course of the following description are attained in such a mechanism as is illustrated in the accompanying drawings, and the invention resides in certain novel features which will be particularly pointed out in the claims following the description.

In the drawings:

Figure 1 is a plan view of my attachment in its operative position;

Fig. 2 is a side elevation of the same;

Fig. 3 is an enlarged plan view of the attachment, the cultivator frame being omitted;

Fig. 4 is an enlarged perspective view of a portion of the operating gearing;

Fig. 5 is a front elevation of the cutter and its support;

Fig. 6 is a vertical section through the cutter support and showing the means for operating the cutter.

A portion of a cultivator frame, including a ground wheel, is shown at 1 in Figs. 1 and 2 of the accompanying drawings and in the said drawings the reference numeral 2 indicates a bracket or plate secured to the front side of the arch 3 or other fixed part of the cultivator frame. To the rear side of the said arch 3, I secure a bracket or supporting block 4 and from the said block and arm the supplemental beam 5 extends rearwardly. Pivotally secured to the lower portion of the block 4, and preferably by being mounted upon a shaft 6 disposed transversely in rearwardly projecting lugs or ears 7 of the block are hangers 8 in the rear ends of which is mounted an axle 9 carrying a wheel or roller 10 which is adapted to run upon the ground and actuate the said axle 9 which carries a sprocket wheel 11. A chain 12 is trained around the said sprocket 11 and a sprocket 13 on the shaft 6 whereby the said shaft is rotated as the machine is drawn over the field. The hangers 8 are preferably extensible, as will be readily understood, so that the proper tension may be maintained upon the chain 12 and in the drawings the said hangers are shown as consisting of two sections slidably connected by a ring or collar 14 and secured in an adjusted position by a bolt 15 and a suitable nut mounted thereon. A pin or rod 16 rises from the axle 9 and plays in the rear free end of the beam 5, as shown, a spring 17 being coiled around the rod between the said beam and the axle so that the roller or wheel 10 will be held yieldably to the ground and caused to positively drive the gearing but may readily ride over stones and other obstructions. On the end of the shaft 6 remote from the sprocket 13, I secure a beveled pinion 18 which meshes with a gear 19 on the lower end of a vertical shaft 20 which is journaled in the block 4, as shown. Upon the upper end of this shaft 20, I secure a sprocket pinion 21 and a chain 22 is trained around the said pinion and around other pinions at the heads of the cutter supports to actuate the gearing by which the cutters are rotated.

As shown clearly in Figs. 1 and 3, the bracket 2 projects forwardly and at both sides of the arch 3 or other member of the cultivator frame. In the ends of the said bracket, I secure posts or standards 23 to the lower ends of which the scrapers or cultivator blades 24 are secured by a bolt 25 passing through an enlargement of the standard and through a lug 26 on the blade. The leg or standard 23 is vertically slotted, as shown at 27, and also has a vertical bore 28 formed therethrough, the said bore opening through the upper end of the post and terminating at its lower end in a cavity or opening 29 formed in the post, as clearly shown in Fig. 6. A vertical shaft 30 is rotatably fitted in the bore 28 and has its upper end extended above the bracket 2, as clearly shown, and equipped with a sprocket wheel 31 around which the chain 22 is trained. To the lower end of the said shaft 30, I secure a beveled pinion 32 which meshes with a similar pinion 33 on a transverse shaft 34 which passes through the chamber 29 in the post and also through the slot 27 therein, being journaled in that portion of the post constituting the outer wall of the slot 27 and also in a plate or cap 35 covering the outer open end of the chamber 29 as will be readily understood. A cutting disk 36 is secured upon the shaft 34 within the slot 27 and will be positively rotated when the described mechanism is set in motion.

To maintain the proper tension upon the chain 22, I secure upon the block 4 a laterally extending arm 37 having an idler sprocket 38 mounted upon its inner end and provided with a longitudinal slot 39 at its outer end through which a bolt 40 is inserted into the block 4 whereby the said arm may be adjusted so that the engagement of the sprocket 38 with the chain 32 will maintain the chain under proper tension.

It will be readily understood from the foregoing description and upon reference to Figs. 5 and 6 that the cutting disk 36 is located just above the scraper or cultivator blade 24 so that it may readily act upon the vines and weeds turned up by the scraper and, to positively direct the said vegetation to the cutter, deflecting plates 41 are secured to the lower end of the post 23 at opposite sides of the cutter and have their forward edges inclined upwardly and rearwardly from the cultivator blade 24 so that the forward travel of the machine will force the weeds and other plants up against the edge of the cutting disk as will be readily understood.

As the machine is drawn over the field, the roller or wheel 10 will be rotated by reason of its engagement with the surface of the ground and the axle 9 thereby directly set in motion. The motion of the axle 9 will be transmitted through the chain 12 to the sprocket 13 and shaft 6 and from said shaft will be transmitted through the gears 18 and 19 and the shaft 20 to the sprocket 21 and the chain 22. The travel of the chain 22 will obviously effect rotation of the sprockets 31 and the shafts 30 to which they are secured so that the pinions 32 and 33 will be rotated and the cutting disk 36 thereby caused to rotate and cut through the vines and stems forced against it by the forward travel of the machine.

It will thus be seen that I have provided a very simple, efficient and direct acting weed cutter which may be readily applied to any form of cultivator or wheeled plow without material change in the construction of any of the parts. My device will not interfere with the usual operation of the cultivator but will facilitate that operation by preventing choking of the cultivator blades and will not add materially to the draft of the machine.

Having thus described the invention, what is claimed as new is:

1. The combination with a cultivator frame, of a post secured thereon, a cultivator blade carried by the lower end of said post, a rotary cutter mounted on said post adjacent and above the blade, deflecting plates secured to the post to direct vines from the blade to the cutter, and means supported on the cultivator frame for positively actuating said cutter.

2. The combination with a cultivator frame, of a post secured thereon, a rotary cutter carried by the post, a shaft mounted vertically in the post, gearing connecting said shaft with the cutter, and means carried by the cultivator frame for rotating said shaft.

3. The combination with a cultivator frame, of a post secured thereon, a rotary cutter carried by the post, a shaft disposed vertically within the post and operatively connected with said cutter, a sprocket secured on the upper end of the said shaft, a second sprocket carried by the cultivator frame in rear of the first-mentioned sprocket, a chain trained around said sprockets, and means carried by the cultivator frame for positively actuating the second-mentioned sprocket.

4. The combination with a cultivator frame, of brackets secured thereto, a post mounted in one of said brackets at the forward end thereof, a rotatable cutter carried by said post, a shaft mounted vertically in the post and operatively connected with said cutter, a sprocket on the upper end of said shaft, a shaft mounted vertically in the rear end of one of the brackets, a sprocket on the upper end of said shaft operatively connected with the first-mentioned sprocket, a gear on the lower end of said last-mentioned vertically disposed shaft, a horizontal shaft in said bracket below said gear, a gear on said horizontal shaft meshing with the first-mentioned gear, and means actuated by the travel of the cultivator for rotating said horizontal shaft.

5. The combination with a cultivator frame, of a supporting beam extending rearwardly therefrom, a post supported on the cultivator frame in advance of said beam, a rotary cutter carried by said post, a vertical shaft housed in said post and operatively connected with said cutter, hangers disposed below the beam and extending downwardly and rearwardly, an axle carried by the rear ends of said hangers, a ground wheel fixed upon said axle, yieldable means disposed between the beam and the axle for holding the said wheel to the ground, and gearing actuated by said axle and connecting the same with the vertically disposed shaft in the post.

In testimony whereof I affix my signature.

ELMER E. LILES. [L. S.]